Feb. 27, 1923.
A. T. BROWN
1,446,825
GEAR SHIFTING MECHANISM
Filed Oct. 15, 1919
2 sheets-sheet 1
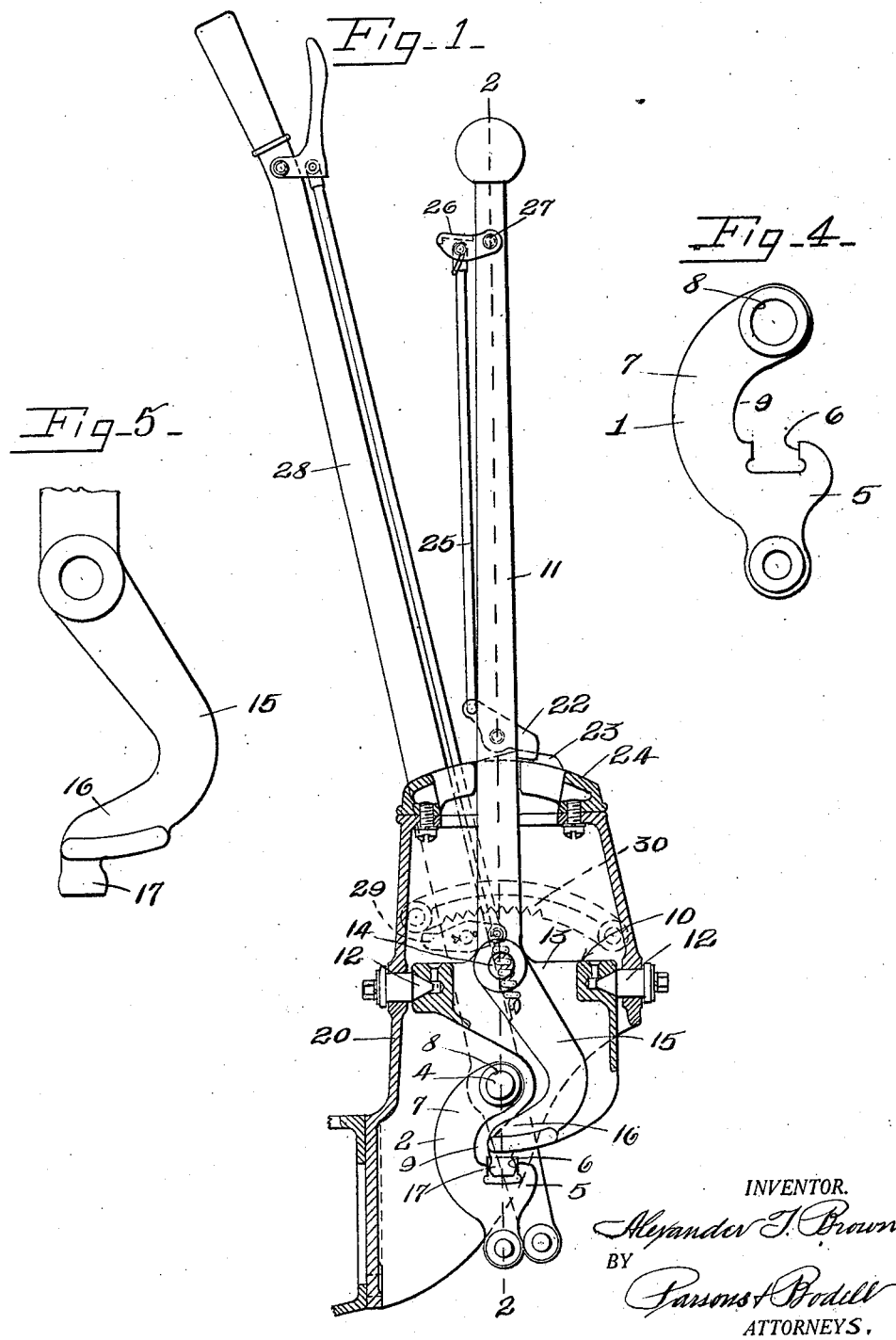
INVENTOR.
Alexander T. Brown.
BY
Parsons & Bodell
ATTORNEYS.

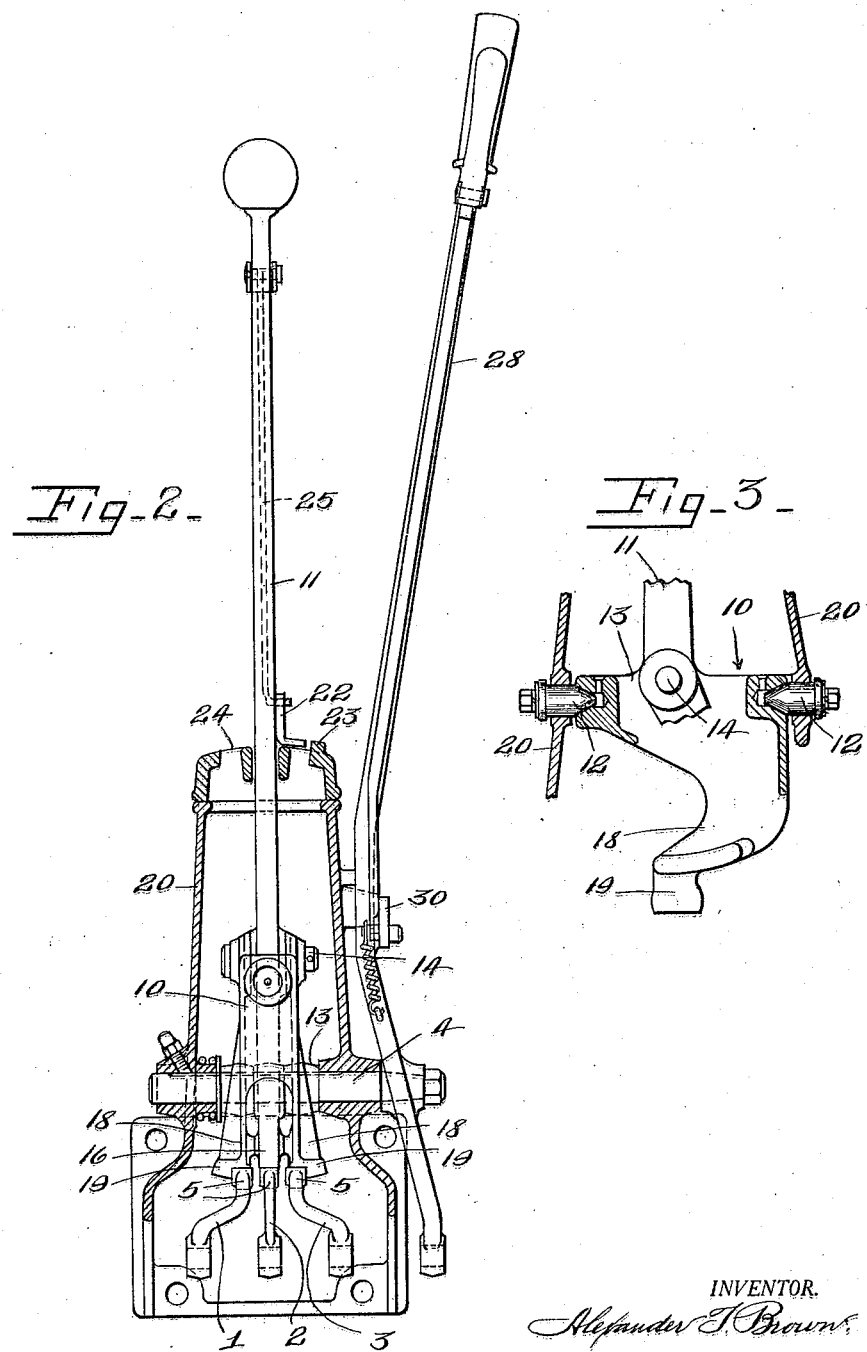

Patented Feb. 27, 1923.

1,446,825

UNITED STATES PATENT OFFICE.

ALEXANDER T. BROWN, OF SYRACUSE, NEW YORK, ASSIGNOR TO THE BROWN-LIPE GEAR COMPANY, OF SYRACUSE, NEW YORK, A CORPORATION OF NEW YORK.

GEAR-SHIFTING MECHANISM.

Application filed October 15, 1919. Serial No. 330,826.

*To all whom it may concern:*

Be it known that I, ALEXANDER T. BROWN, a citizen of the United States, and a resident of Syracuse, in the county of Onondaga and State of New York, have invented a certain new and useful Gear-Shifting Mechanism, of which the following is a specification.

This invention has for its object the production of a gear shifting mechanism for change speed gears of motor vehicles which is particularly simple in construction and highly efficient and durable in use.

It consists in the novel features and in the combinations and constructions hereinafter set forth and claimed.

In describing this invention, reference is had to the accompanying drawings in which like characters designate corresponding parts in all the views.

Figure 1 is a side elevation, partly in section of my gearing shifting mechanism, contiguous parts of the vehicle being also shown.

Figure 2 is a sectional view on line 2—2, Fig. 1.

Figure 3 is a detail view of the pivoted support for the operating lever.

Figure 4 is an enlarged detail view of one of the motion transmitting levers.

Figure 5 is a detail view of the lower end of the shifting lever.

This gear shifting mechanism comprises a plurality of motion transmitting members arranged side by side or in a row, a pivoted support, and an operating lever having selecting and shifting movements, the lever being pivoted to the support and having an arm for selecting and shifting one of the motion transmitting members, the support having means associated therewith for locking the unselected motion transmitting members.

1, 2 and 3 are respectively the motion transmitting members which are here illustrated as levers loosely mounted upon a shaft 4 to rock thereon independently of each other, said levers extending downwardly from the shaft 4 and being connected at their lower ends to rods which in turn are connected to the forks for shifting the gears of a change speed gear as will be understood by those skilled in the art. In the illustrated form of my invention, each of said levers is formed with an intermediate part 5 formed with an upwardly facing notch or slot 6 usually located directly below the pivot of the lever 1, 2 or 3 and with a curved or arc-shaped part 7 extending upwardly from the intermediate part 5 and provided with an opening 8 by means of which the levers 1, 2 and 3 are mounted on the shaft 4, this opening 8 being also preferably located directly above the axis of the lever 1, 2 or 3 and the slot or recess 6 therein. The arc-shaped part 7 forms a passage 9 in each lever for a purpose to be hereinafter described, into which passage the notch or slot 6 opens.

The shaft 4 is suitably supported by the frame of the vehicle or by the transmission gear casing.

10 is the support for the operating lever 11, the support 10 being mounted on pivots 12 which are arranged with their axes extending above and crosswise of the axis of the shaft 4 of the motion transmitting levers 1, 2 and 3, the support being substantially oblong in plan and the pivots being located at the ends thereof. The support is formed with a slot 13 extending lengthwise thereof, that is in the direction of the axial line of the pivots 12.

The lever 11 extends through the slot 13 and is mounted on a shaft 14 carried by the support 10 and extending crosswise of the slot 13 and the axis of the pivots 12. The lever 11 is formed with a downwardly and forwardly extending arm 15 having a rearwardly extending portion 16 projecting into the recess 9 of the levers 1, 2 and 3, said portion 16 having a down-turned finger 17 for selectively entering the slots 6 of the levers 1, 2 or 3.

The pivotal points 4, 8 and 14 are arranged in substantially the same plane and also the recesses 6 are located in said plane. The pivots 12 are here shown as formed with cone points which enter complemental recesses in the ends of the housing to which the support is pivoted.

As force is applied to the handle of the lever 11 to rock the support 10 on its pivots 12, the finger 17 moves out of the notch 6 of one lever 1, 2 or 3 into the notch 6 of another lever and upon movement of the operating member about its axis 14, the lever 1, 2 or 3 engaged by the finger 17 is moved about its axis 4 and the motion thereof transferred to a gear to be shifted.

The means associated with the support 10 for locking the levers 1, 2 and 3 as here shown includes arms 18 depending from opposite sides of the support 10 on opposite sides of the row of levers 1, 2, 3, the arms 18 having widened ends 19 arranged to enter the notches 6 of the levers 1, 2, 3, the ends 19 being wide enough to engage two levers at the same time and said notches being concentric with the axis 12 of the support 10.

When the operating lever 11 is in central position, the finger 17 thereof is located in the notch 6 of the central lever 2 and the ends 19 of the arms 18 are located in the notches 6 of the levers 1 and 3. Upon movement of the lever 11 forwardly or rearwardly about its axis 14 the middle lever 2 will be shifted and the outside levers 1 and 3 held from shifting movement. However, upon movement of the lever 11 laterally about the axis 12 of the support 10 as for instance to the right, Fig. 2, the arm 15 moves to the left carrying the finger 17 thereof out of the notch 6 of the lever 2 into the notch 6 of the lever 1 and the support 10 during this rocking movement carries the widened end 19 of the left hand arm 18, Fig. 2 out of the recess 6 of the lever 1 and the end 19 of the right hand arm 18 into engagement with both levers 2 and 3.

The support 10 is carried by a suitable housing 20. The operating lever is provided with a suitable lock which prevents movement of the operating lever in the direction to shift the gearing into reverse unless said lock is operated, the lock consisting of a lever 22 pivoted between its ends to the operating lever 11 and coacting at one end with the shoulder 23 on the guide plate 24 and being connected at its other end to the lower end of the rod 25, the upper end of which is connected to a lever 26 pivoted at 27 to the operating lever 11. Normally, the lock 22 prevents unintentional shifting of the lever 11 to shift the gearing into reverse. When it is desired to reverse, the lever 26 must be first operated. Also a suitable brake lever 28 is shown as mounted on the outside of the housing and provided with a suitable pawl 29 coacting with a rack 30 carried on the outside of the housing 20.

What I claim is:

1. In a gear shifting mechanism, the combination of a plurality of motion transmitting members, a pivoted support formed with a slot extending in the direction of its axis and an operating lever extending through the slot and being pivoted to the support on an axis extending crosswise of the slot, the operating lever having an arm for selectively engaging the motion transmitting members during the rocking of the support about its axis and for shifting the selected member during the movement of the operating lever about its own axis; and locking means carried by the pivoted support to move therewith and lock the unselected motion transmitting member, substantially as and for the purpose specified.

2. In a gear shifting mechanism, the combination of a plurality of motion transmitting levers pivoted at like ends, and an operating lever having selecting and shifting movements, the operating lever being pivoted above the upper ends of the motion transmitting levers and having a downwardly extending arm coacting with the motion transmitting levers between their ends, substantially as and for the purpose set forth.

3. In a gear shifting mechanism, the combination of a plurality of motion transmitting levers pivoted at like ends and having means connected to their opposite ends for transferring the motion thereof, and also having between their ends vertical transverse notches, and a selecting and shifting lever pivoted above the motion transmitting levers and having a downwardly extending arm formed with an engaging portion arranged to enter the transverse notch of any one of the motion transmitting levers and movable from one notch to the other during the selecting movement of the operating lever, substantially as and for the purpose described.

4. In a gear shifting mechanism, the combination of a plurality of motion transmitting members, a pivoted support, an operating lever pivoted to the support, the axis of the operating lever extending at an angle to the axis of said support, said operating lever having an arm for selectively engaging the motion transmitting members during the pivotal movement of the support and for shifting the selected lever during movement of said operating lever about its own pivotal axis, and means operated by the support for engaging and locking the unselected motion transmitting members, substantially as and for the purpose specified.

5. In a gear shifting mechanism, the combination of a row of motion transmitting levers formed with transverse notches, a pivoted support, and an operating lever pivoted to the support, the axis of the operating lever extending at an angle to the axis of the support, the operating lever having an arm provided with an engaging portion located in the notch of one of the levers and movable from one notch to the other upon rocking movement of the support to select one of the motion transmitting levers to be shifted, the support having arms extending at opposite ends of the row of levers and formed with means movable in the notches of the unselected motion transmitting levers to lock the same, substantially as and for the purpose set forth.

6. In a gear shifting mechanism, the combination of a row of power transmitting levers formed with vertical transverse notches, a pivoted support, and an operating lever pivoted to the support, the axis of the operating lever extending at an angle to the axis of the support, and the notches of the motion transmitting levers being arranged concentric with the axis of the support, the operating lever having an arm provided with an engaging portion extending into the notch of one of the motion transmitting levers and movable from one notch to another upon rocking movement of the support to select one of the motion transmitting levers to be shifted, the support having arms extending on opposite sides of the row of levers and formed with means movable into the notches of the unselected motion transmitting levers to lock the same from movement, substantially as and for the purpose described.

7. In a gear shifting mechanism, the combination of a row of motion transmitting levers pivoted at their lower ends and formed with vertical transverse notches between their ends, a support pivoted on an axis arranged above the row of levers and extending in a direction at a right angle to the axis of said levers, and an operating lever pivoted to the support above the upper ends of said motion transmitting levers, the axis of the operating lever extending crosswise of the axis of the support, the operating lever having a downwardly extending arm having a finger at its lower end extending into the notch of one of the levers and movable out of the notch of one lever into the notch of another lever to select the latter upon rocking movement of the support, and the support having arms extending on opposite ends of the row of levers and having means extending into the transverse notches and movable into and out of the notches during the movement of the operating lever and the support, to lock the unselected motion transmitting levers from shifting movement, substantially as and for the purpose specified.

In testimony whereof, I have hereunto signed my name, at Syracuse, in the county of Onondaga, and State of New York, this 11th day of Oct., 1919.

ALEXANDER T. BROWN.